Dec. 17, 1968     R. C. FISCHER     3,416,611
AUTOMATIC RETURN TRIP FOR MOLDBOARD PLOW
Filed Oct. 27, 1966     3 Sheets-Sheet 1
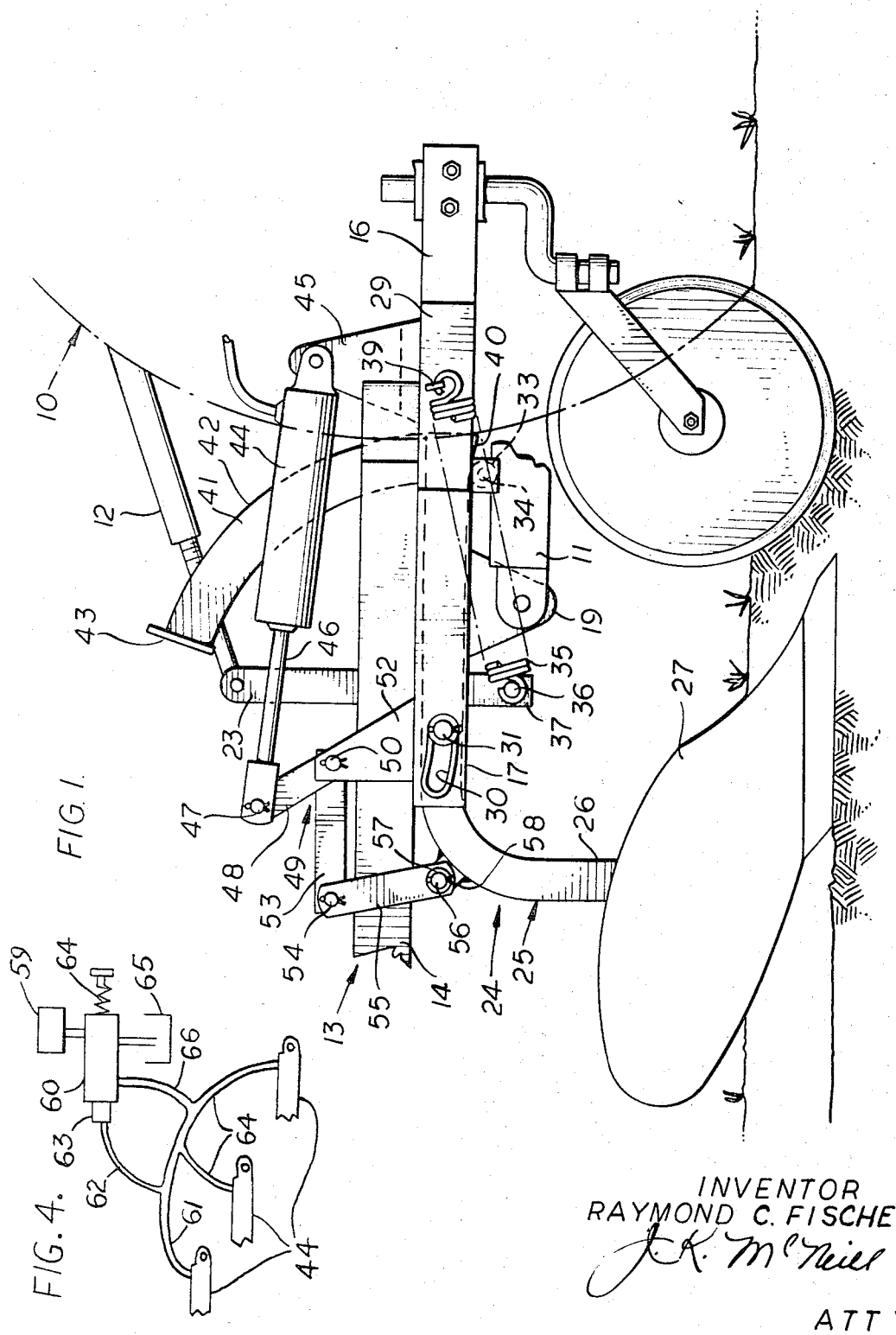
INVENTOR
RAYMOND C. FISCHER
ATTY

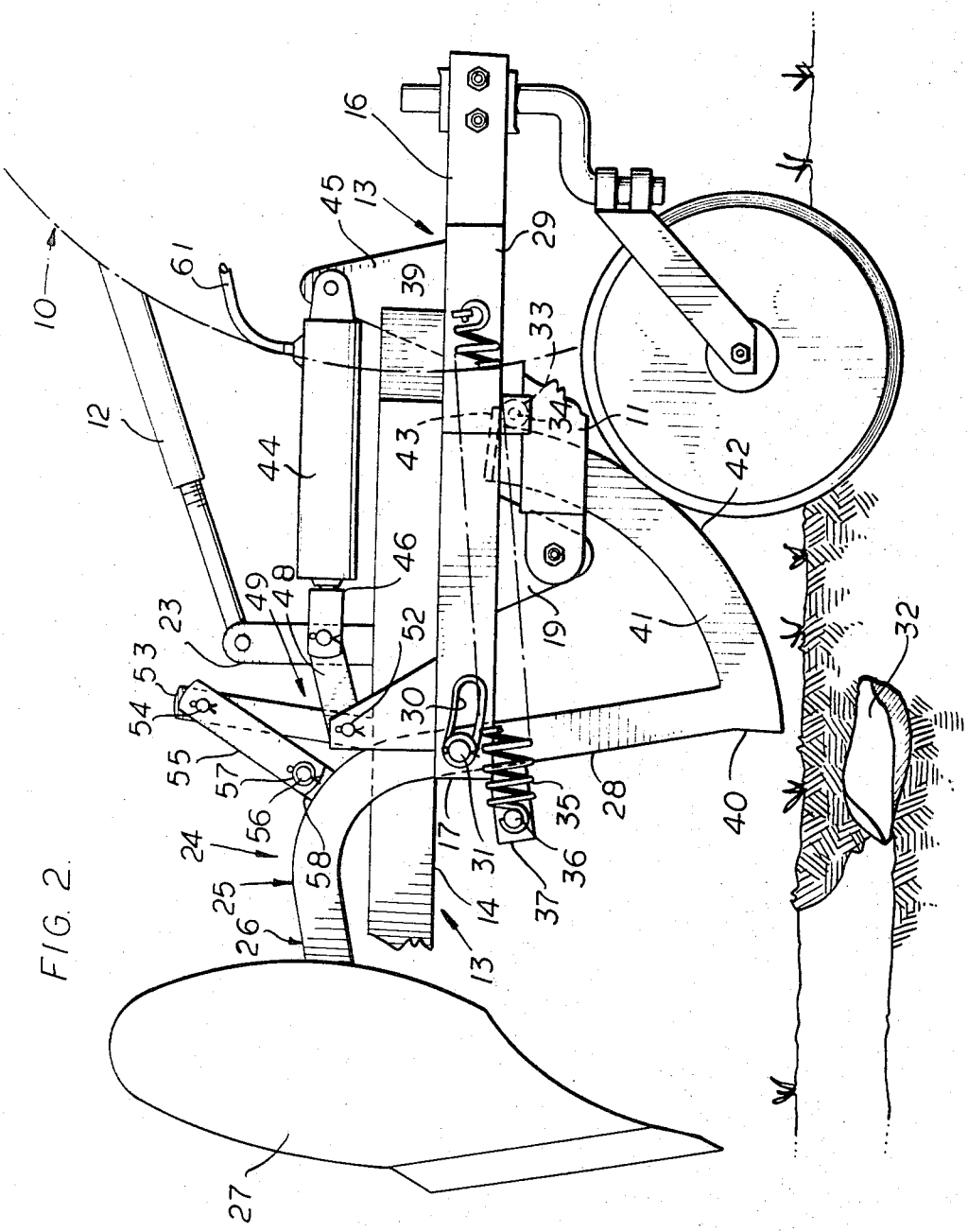

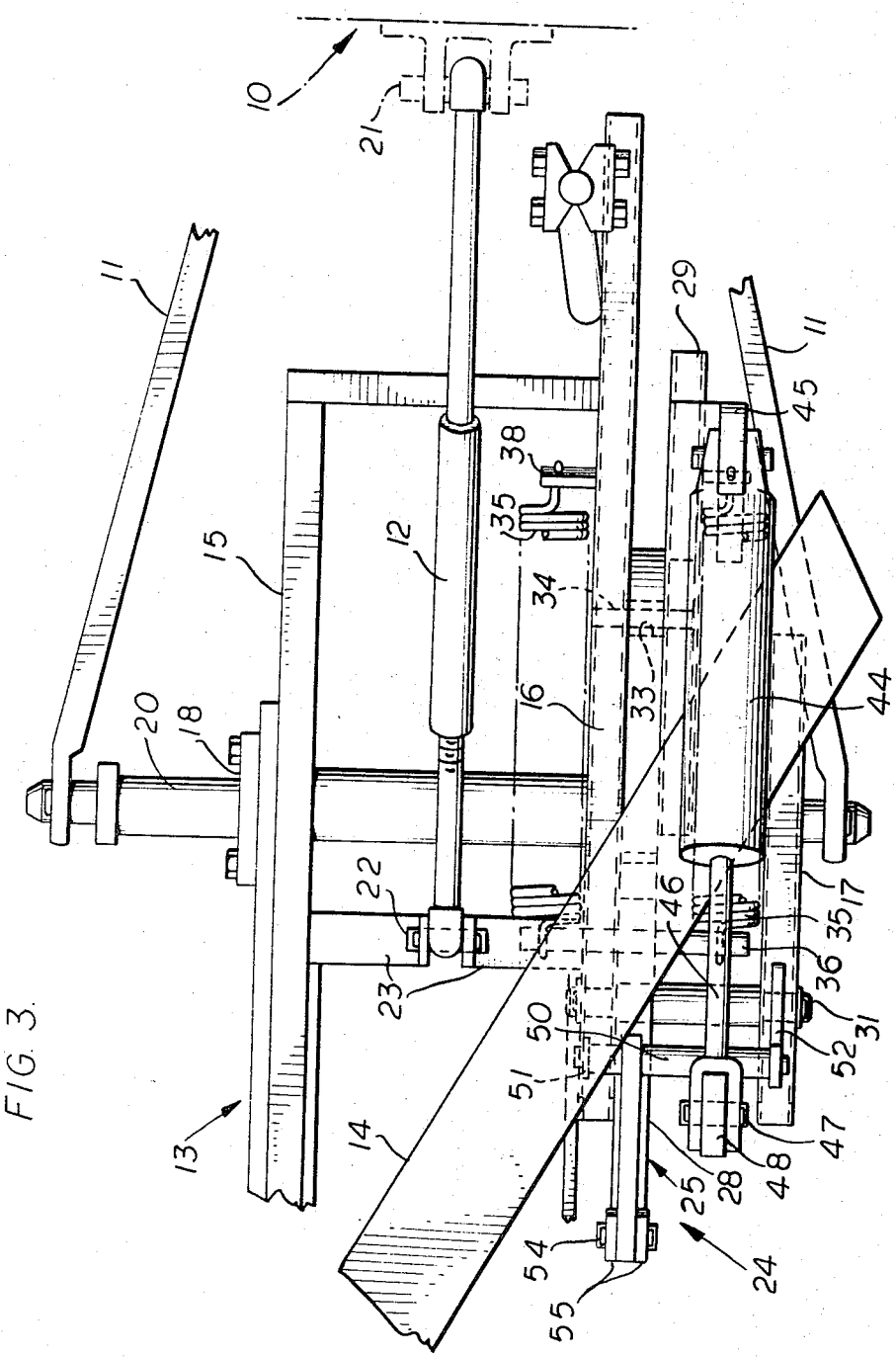

United States Patent Office 3,416,611
Patented Dec. 17, 1968

3,416,611
AUTOMATIC RETURN TRIP FOR MOLDBOARD PLOW
Raymond C. Fischer, Hinsdale, Ill., assignor to International Harvester Company, Chicago, Ill., a corporation of Delaware
Filed Oct. 27, 1966, Ser. No. 590,035
7 Claims. (Cl. 172—261)

This invention relates to earthworking implements such as plows, and particularly to tripping mechanism therefor.

In safety trip plows and the like when a plow unit enocunters an obstruction in the ground and trips to an inoperative position, it is customary to reset the tripped bottom either by lifting the implement and relying upon gravity, or by backing the implement and allowing the pressure of the soil against the tripped tool to force it back to its operating position. These procedures have resulted in considerable lost time, and an object of this invention is to provide a plow trip which will permit one or more tripped units of a multi-bottom plow to trip and be returned to operating positionin without interrupting the forward motion of the implement.

Another object of the invention is a provision of novel plow tripping mechanism utilizing spring means to resist the tripping of the plow unit and hydraulic power transmission means including a hydraulic cylinder to return the plow to its operating position without imposing draft forces on the hydraulic system during normal operation.

Another object of the invention is the provision, in a trip plow having means accommodating cushioned rearward movement of the plow in response to draft forces, of means in the mounting of the plow unit on the supporting frame for causing the point of the plow to trip upwardly during said rearward movement.

Other objects and advantages of the invention will become clear from the following detailed description when read in conjunction with the accompanying drawings wherein:

FIGURE 1 is a view in side elevation of the rear end of a tractor having mounted thereon a moldboard plow carrying earthworking trip units incorporating the features of this invention and illustrating the positions of the parts when the plow unit is in operation, FIGURE 2 is a view similar to FIGURE 1 showing the tripped position of the plow unit;

FIGURE 3 is a plan view of the structure shown in FIGURE 1; and

FIGURE 4 is a diagrammatic illustration of hydraulic means automatically operable to automatically return one or more tripped plow units of a multi-bottom plow to their operating positions.

In the drawings a portion of a moldboard plow of the direct connected type is shown adapted for mounting upon a tractor designated by the numeral 10 having suitable power lift means thereon including laterally spaced lower hitch links 11 and an upper link 12.

The tool-carrying supporting frame 13 of the implement includes a diagonally extending backbone in the form of a beam 14, rectangular in cross-section, to which are affixed longitudinally extending bars 15, 16 and 17, depending brackets 18 and 19 supporting a transverse shaft 20 to the ends of which are pivotally connected lower links 11. The forward ends of links 11 are pivotally connected in a manner well known in the art to tractor 10, upper link 12 being connected at one end to a pin 21 carried by the tractor and at its other end to a pin 22 carried by the converging upper ends of straps 23 secured to bars 15 and 16.

A moldboard plow unit 24 is mounted on frame 13, and may be one of a plurality of such units carried by the frame and disposed at spaced locations along the backbone 14. Plow unit 24 comprises a tool-carrying beam or standard 25 having a downwardly extending portion 26 carrying at its lower end a plow bottom 27, and a horizontal, forwardly extending portion 28 generally parallel to rails or frame bars 15, 16 and 17, and swingably disposed between frame bar 16 and another frame bar 29 affixed to and extending forwardly from backbone 14.

Bars 16 and 17 are provided with arcuately shaped slots 30 extending generally longitudinally of the implement adapted to slidably receive the ends of a pivot pin 31 carried by standard 25 medially of its ends to accommodate tripping of the plow unit 24, upon encountering an obstruction such as that indicated at 32 in FIGURE 2, from an operating position of plow bottom 27 as shown in FIGURE 1 to the safety tripped position of FIGURE 2.

In the operating position of FIGURE 1, the plow unit is held against tripping by means including a roller 33 mounted on a pin 34 carried by bars 16 and 29, roller 33 being engageable with the under side of the horizontal portion 28 of standrad 25 and effectively preventing clockwise rotation of the standard. During normal operation of the implement pivot pin 31 is urged toward the forward end of slot 30 by the provision of cushion springs 35, one of which is anchored to each end of a rod 36 carried by a lug 37 affixed to and projecting downwardly from the horizontal portion 28 of the standard. The other ends of springs 35 are anchored to lugs 38 and 39 on frame bars 16 and 29, respectively.

In normal operation of the plow bottom 27 the plow unit is retained against tripping, and standard 25 and pivot pin 31 move rearwardly in the slots 30 against the action of springs 35 in response to normal draft forces encountered during operation. Due to the rearward and upward curve of slot 30, rearward movement of pin 31 is accompanied by upward movement thereof and shallowing of the plow. Also, increase in draft requirements resulting in rearward cushioning of plow unit 24 is accompanied by a counterclockwise movement of tool-carrying standard 25 about the axis of pin 31 by virtue of the engagement of roller 33 with a forwardly and downwardly inclined cam face 40 on the portion of the horizontal section 28 of the tool standard extending forwardly of roller 33 in the position of FIGURE 1. Upon rearward cushioning movement of the plow unit, roller 33 causes the forward end of the standard to tilt upwardly, thus tilting the point of the plow bottom 27 upwardly and augmenting the effect of the upward movement of the plow resulting from pin 31 moving upwardly as it nears the rear end of slot 30, resulting in the plow rising to a shallower operating depth. As the load on the plow bottom 27 increases the plow unit moves rearwardly and upwardly within the limitations of pin 31 and slots 30, but the point of the plow bottom rises faster.

Upon the plow unit encountering an abnormal draft force such as occasioned by the obstruction 32, pin 31 moves to the rear ends of slots 30, at which point the forward end of the plow-carrying standard moves away from the roller 33 alowing the plow unit to swing to the position of FIGURE 2. The position of the plow unit in tripping is controlled in part by the provision of an arcuately shaped extension 41 extending upwardly from the forward end of horizontal portion 28 of the standard having a curved face 42 engageable with roller 33 throughout the tripping operation, the clockwise swinging of the plow unit about the axis of pivot pin 31 being limited by the provision of a shoulder 43 at the end of member 41 engageable with roller 33, constituting a stop means for the plow unit.

Further control of the plow unit in tripping and automatic return of the tripped unit to its operating position are accomplished by hydraulic from a transmission mechanism including a hydraulic cylinder 44 anchored to a bracket 45 affixed to bar 29 and having a piston rod 46 slidable therein and pivotally connected by a pin 47 with one arm 48 of a bellcrank 49 formed by a rod 50, to which arm 48 is affixed, and supported at its ends by brackets 51 and 52 affixed to bars 16 and 17, respectively. The other arm 53 of the bellcrank is affixed to rod 50 and is connected by a pivot pin 54 with a pair of thrust links 55, the lower ends of which carry a pivot pin 56 received in an oversize opening 57 in a lug 58 secured to standard 25. The lost motion provided by the oversize opening 57 for pin 56 accommodates rearward cushioning the plow unit 24 relative to the supporting frame of the implement in normal operation in response to variations in draft forces acting on the plow bottom 27 without transmitting these forces to the hydraulic cylinder 44 until tripping of the plow unit occurs, the latter acting through links 55 and bellcrank 49 to collapse cylinder 44.

Hydraulic cylinder 44, one of which is provided for each plow unit 24 of a multi-bottom plow, forms part of a hydraulic system, shown diagrammatically in FIGURE 4, receiving fluid under pressure from a source indicated at 59, preferably on the tractor under the control of a valve mechanism 60 of the spool type allowing fluid exhausted from one or more cylinders 44 upon tripping of the associated plow unit to pass through hose 61 to a bleed line 62 connected to one end of spool 63 of valve 60, the spool being balanced for normal operation of the plow units by a spring 64 engaging the other end of the spool against the pressure in the bleed line 62. When a plow unit begins to trip a load is imposed on the associated cylinder 44, increasing pressure in bleed line 62, overcoming balance spring 64 and moving the spool, permitting oil to return to reservoir 65. When the obstruction is passed, pressure in the hydraulic circuit drops and spring 64 automatically moves spool 63 to supply under pressure from pump 59 through a line 66 back to the cylinder circuit to automatically return the tripped plow to operating position without interrupting the forward progress of the implement.

It is believed that the construction and operation of the novel automatic return plow trip of this invention will be clearly understood from the foregoing description.

What is claimed is:

1. In a trip plow, a traveling supporting frame, a plow including a standard having a lower tool-carrying portion and a forwardly directed portion, means mounting said plow on said frame for tripping in response to abnormal draft forces comprising, pivot means connecting the tool-carrying standard to the frame to accommodate said tripping, said pivot means including a pin and slot connection accommodating rearward movement of the plow relative to the frame, holding means acting between the frame and the plow to prevent tripping of the latter and releasable after a predetermined rearward movement of the plow, spring means acting between the plow and the frame to yieldably oppose said rearward movement of the plow, hydraulic power transmitting means mounted on the frame for cushioning the plow when it is tripped and automatically operable to return it to its operating position, and connecting means between the plow and said hydraulic power transmitting means including lost motion means accommodating limited rearward movement of the plow in response to draft forces acting thereon prior to the transmission of said draft forces to said hydraulic power transmission means.

2. The invention set forth in claim 1, wherein said holding means includes a stop on the frame engageable with the forward portion of said standard, the latter being moveable rearwardly out of engagement with said stop when the plow trips, and upwardly extending projection at the forward end of the standard having a curved surface engagable with said stop during tripping of the plow to facilitate return of the plow from its tripped to its operating position.

3. The invention set forth in claim 2, wherein the portion of said standard engageable with said stop is forwardly and downwardly inclined, whereby the forward end of the standard is tilted upwardly during rearward movement thereof.

4. In a trip plow, a traveling supporting frame, a plow including a standard having a lower tool-carrying portion and a forwardly directed portion, means mounting said plow on said frame for tripping in response to abnormal draft forces comprising, pivot means connecting the tool-carrying standard medially of its ends to the frame to accommodate said tripping, stop means on the frame rearwardly of the forward end of said standard and engageable therewith to oppose the tripping of the plow, said pivot means including a pin and slot connection accommodating a predetermined rearward movement of the standard relative to the frame in response to draft forces acting on the plow to allow the standard to move out of engagement with said stop means, the forward portion of the standard including cam means adapted to elevate the forward end of the standard about the axis of said pivot means prior to the tripping of the plow, and spring means extending between the plow and the frame resisting the rearward movement of the plow.

5. The invention set forth in claim 4, wherein a projection on the forward end of said standard extends upwardly therefrom and has a curved surface engageabe with said stop means when the plow is tripped to facilitate return of the plow to its operating position.

6. The invention set forth in claim 5, wherein hydraulic power transmission means is operatively connected between the frame and the plow and automatically receives fluid under pressure to return the plow to its operating position after tripping.

7. The invention set forth in claim 6, wherein the connection of the hydraulic power transmission means to said plow includes linkage having lost motion accommodating rearward movement of said plow relative to the frame against the action of said spring means in response to draft forces acting on the plow.

References Cited

UNITED STATES PATENTS

| | | | |
|---|---|---|---|
| 3,292,713 | 12/1966 | Mannheim et a. | 172—269 |
| 3,191,688 | 6/1965 | Morkoski et al. | 172—269 |
| 3,326,300 | 6/1967 | Morkoski et al. | 172—264 |

ABRAHAM G. STONE, *Primary Examiner.*

JAMES W. PETERSON, *Assistant Examiner.*

U.S. Cl. X.R.

172—264